United States Patent
Tomine (10) Patent No.: US 7,826,916 B2
(45) Date of Patent: Nov. 2, 2010

(54) METHOD AND SYSTEM FOR CONTROLLING SEMICONDUCTOR MANUFACTURING EQUIPMENT

(75) Inventor: Tetsu Tomine, Fujimi (JP)

(73) Assignee: Seiko Epson Corporation (JP)

( * ) Notice: Subject to any disclaimer, the term of this patent is extended or adjusted under 35 U.S.C. 154(b) by 1303 days.

(21) Appl. No.: 11/351,202

(22) Filed: Feb. 9, 2006

(65) Prior Publication Data

US 2006/0175553 A1 Aug. 10, 2006

(30) Foreign Application Priority Data

Feb. 10, 2005 (JP) .............................. 2005-034223

(51) Int. Cl.
*G06F 19/00* (2006.01)

(52) U.S. Cl. ....................................................... 700/121

(58) Field of Classification Search ................. 700/121, 700/173, 291, 296, 306
See application file for complete search history.

(56) References Cited

U.S. PATENT DOCUMENTS

| 6,356,804 B1* | 3/2002 | Conboy et al. ............... 700/228 |
| 6,937,917 B2* | 8/2005 | Akiyama et al. ............. 700/121 |
| 6,986,261 B2* | 1/2006 | Sasaki et al. .................. 62/201 |
| 6,990,747 B2 | 1/2006 | Kitoku et al. |
| 7,201,851 B2 | 4/2007 | Kitoku et al. |
| 2006/0143706 A1* | 6/2006 | Kawasaki et al. ............. 726/19 |

FOREIGN PATENT DOCUMENTS

| JP | 2003-282465 | 10/2003 |
| JP | 2004-319761 | 11/2004 |

* cited by examiner

*Primary Examiner*—Albert DeCady
*Assistant Examiner*—Chad Rapp
(74) *Attorney, Agent, or Firm*—Harness, Dickey & Pierce, P.L.C.

(57) ABSTRACT

A method for controlling semiconductor manufacturing equipment in a waiting mode, comprising:
retrieving information about a waiting time for a product to be provided to the semiconductor manufacturing equipment on a production line, the product being to be subjected to predetermined processing by the semiconductor manufacturing equipment;
comparing the waiting time with a period of time required for energy saving control, the period of time required for energy saving control including:
lowering electric power and other energy used by the semiconductor manufacturing equipment in the waiting mode to a low-energy level at which the processing is not ready, and
then raising the electric power and the other energy to a level at which the processing is ready; and
providing the energy saving control during the waiting time if the waiting time is longer than the required period of time.

7 Claims, 6 Drawing Sheets

FIG. 1

| DIVISION | COMPONENT (DEVICE) | | ENERGY | PROCESSING | STANDBY-0 | STANDBY-1 | STANDBY-2 | STANDBY-3 |
|---|---|---|---|---|---|---|---|---|
| PLASMA | RF POWER SUPPLY, MAGNETIC POWER SUPPLY, MATCHING BOX | | | ○○○ | | | | |
| TABLE | TABLE HEATING | | COOLING WATER | ○ | ○ | | | |
| CHAMBER | PROCESS CHAMBER | HEAT EXCHANGER, MEDIA CIRCULATION PUMP | | ○○ | ○○ | ○○ | ○○ | |
| | | TMP | POWER SUPPLY, COOLING WATER | ○○ | ○○ | △△ | △△ | △△ |
| | | DRY PUMP | POWER SUPPLY, COOLING WATER, NITROGEN | ○○○ | ○○○ | △△△ | △△△ | △△△ |
| | TRANSPORT CHAMBER | TMP | POWER SUPPLY, COOLING WATER | ○○ | ○○ | △△ | △△ | |
| | | DRY PUMP | POWER SUPPLY, COOLING WATER, NITROGEN | ○○○ | ○○○ | △△△ | △△△ | △△△ |
| | CASETTE CHAMBER | DRY PUMP | POWER SUPPLY, COOLING WATER, NITROGEN | ○○○ | ○○○ | | | |

○ : ON
△ : INTERMITTENT OPERATION (DEPENDING ON CIRCUMSTANCES)
NO MARK : STOPPED

METHOD AND SYSTEM FOR CONTROLLING SEMICONDUCTOR MANUFACTURING EQUIPMENT

The entire disclosure of Japanese Patent Application No. 2005-034223, filed Feb. 10, 2005 is expressly incorporated by reference herein.

BACKGROUND

1. Technical Field

The present invention relates to a method for controlling semiconductor manufacturing equipment and a system for controlling the equipment, and particularly to a technology to control amounts of electric power and other energy consumed in a waiting mode in which product processing is not carried out depending on the length of waiting time.

2. Related Art

A production line of semiconductor devices has a clean room that makes filtered clean air flow down and various manufacturing equipment arranged in the clean room. Examples of the manufacturing equipment include a diffusion furnace that makes thermal diffusion of an impurity in a semiconductor wafer, a CVD device that provides an insulating film, and a dry etching device that etches an insulating film or a conductive film. Most of the equipment requires not only the electric power but also the other energy, such as evacuated air, cooling water, compressed air, vacuum, nitrogen ($N_2$) and released heat.

While manufacturing equipment is in a waiting mode between product processes, power supply from a radio-frequency power source and a magnetic power source is cut and the output of a heater is reduced to some extent to cut down on energy use in related art. The manufacturing equipment stays in the waiting mode at a level at which product processing can be restarted as soon as a product to be processed next is provided to a loader of the manufacturing equipment (i.e., level at which product processing is ready) so as not to prevent reduction in turnaround time (TAT).

There has been another method to reduce power consumption that uses manufacturing equipment (e.g. coater developer) having a plurality of units providing a semiconductor wafer with different processes. The equipment does not supply electric power to the units in the waiting mode. JP-A-2003-282465 is an example of related art.

Related technologies have been developed not only in the field of electronic devices but in the field of office automation equipment. For example, power consumed by an image forming device like a printer can be reduced by shifting to a power-saving mode automatically after the device comes out of the power-saving mode and forms images. JP-A-2002-120435 is an example of related art.

In general, a production line handles not one type of product but multiple types of products in small lots. Different product types require different product processes. Accordingly, some manufacturing equipment in a production line is frequently used, and the other is not. Furthermore, the frequency of the use of manufacturing equipment varies depending on product types, volume and process timing on a production line in general.

It is therefore rare to keep operating the manufacturing equipment until a predetermined maintenance break. In many cases, the equipment stays in a waiting mode between product processes. The waiting time between product processes may be for several minutes or last a couple of days.

However, related-art manufacturing equipment making up a production line in a waiting mode always stays at a level at which product processing is ready regardless of the length of waiting time before the next product processing. Therefore, a long waiting time causes a large energy loss.

SUMMARY

An advantage of the present invention is to provide a method for controlling semiconductor manufacturing equipment and a system for controlling the equipment that are capable of reducing an energy loss during a waiting mode.

According to a first aspect of the invention, a method for controlling semiconductor manufacturing equipment in a waiting mode, includes:

retrieving information about a waiting time for a product to be provided to the semiconductor manufacturing equipment on a production line, the product being to be subjected to predetermined processing by the semiconductor manufacturing equipment;

comparing the waiting time with a period of time required for energy saving control, the period of time required for energy saving control including:

lowering electric power and other energy used by the semiconductor manufacturing equipment in the waiting mode to a low-energy level at which the processing is not ready, and then raising the electric power and the other energy to a level at which the processing is ready; and providing the energy saving control during the waiting time if the waiting time is longer than the required period of time.

Examples of the semiconductor manufacturing equipment include a dry etching device, a CVD device and a diffusion furnace. The equipment receives electric power and the other energy as energy consumed. Examples of the product include a wafer for manufacturing a semiconductor device and a glass substrate for manufacturing a thin-film transistor (TFT). The waiting time information is available, for example, from an information processing system (lot control system) that calculates time required for a wafer to be processed next to be provided to the semiconductor manufacturing equipment.

The electric power and the other energy in a waiting mode refer to the electric power and the other energy used by the semiconductor manufacturing equipment in the waiting mode between production processes. The other energy refers to energy other than electric power and include evacuated air, cooling water, compressed air, vacuum, nitrogen ($N_2$) and released heat. The level at which the processing is ready refers to a level at which processing can be restarted as soon as a product to be processed next is provided to a loader of the manufacturing equipment.

The method for controlling semiconductor manufacturing equipment of the first aspect reduces energy consumption by reducing the electric power and the other energy to the low-energy level when the waiting time of the equipment is longer than the time required for the energy saving control. The energy saving control restores the electric power and the other energy to the level at which product processing is ready by the end of the waiting time. It is therefore possible to reduce an energy loss without preventing TAT reduction.

According to a second aspect of the invention, the energy saving control in the method of the first aspect includes maintaining the electric power and the other energy used by the semiconductor manufacturing equipment in the waiting mode at the low-energy level for a predetermined period of time between lowering the electric power and the other energy to the low-energy level and raising the electric power and the other energy to the level at which the processing is ready.

It is therefore possible to change the time required for the energy saving control by increasing or decreasing the predetermined period of time, for example.

According to a third aspect of the invention, the predetermined period of time in the method of the second aspect is adjusted in a way that a fixed grace period is provided before the processing starts after the energy saving control is completed.

Even if the standby mode of the semiconductor manufacturing equipment has some variance (in the degree of vacuum and temperature in a chamber or the temperature of a heater, for example) just after the energy saving control, it is possible to converge the variance before the product processing start. Accordingly, the quality of product processing can be stabilized.

According to a fourth aspect of the invention, in the method of any of the first, second and third aspects, the energy saving control provides a plurality of patterns in which the electric power and the other energy at the low-energy level and the required period of time are different from each other. Of the plurality of patterns, if one pattern has the required period of time shorter than the waiting time, the energy saving control is provided with the pattern. If two or more patterns have the required period of time shorter than the waiting time, one pattern having the smallest electric power and other energy at the low-energy level is selected, and the energy saving control is provided with the selected pattern.

It is therefore possible to reduce an energy loss step by step and efficiently depending on the length of the waiting time.

According to a fifth aspect of the invention, a system for controlling semiconductor manufacturing equipment in a waiting mode, includes:

a retrieving part to retrieve information about a waiting time for a product to be provided to the semiconductor manufacturing equipment on a production line, the product being to be subjected to predetermined processing by the semiconductor manufacturing equipment;

a comparison part to compare the waiting time with a period of time required for energy saving control, the period of time required for energy saving control including:

lowering electric power and other energy used by the semiconductor manufacturing equipment in the waiting mode to a low-energy level at which the processing is not ready, and then raising the electric power and the other energy to a level at which the processing is ready; and a controlling part to provide the energy saving control during the waiting time if the waiting time is longer than the required period of time.

The system reduces energy consumption by reducing the electric power and the other energy to the low-energy level when the waiting time of the equipment is longer than the time required for the energy saving control. The energy saving control restores the electric power and the other energy to the level at which product processing is ready by the end of the waiting time. It is therefore possible to reduce an energy loss without preventing TAT reduction.

BRIEF DESCRIPTION OF THE DRAWINGS

The invention will be described with reference to the accompanying drawings, wherein like numbers reference like elements.

DESCRIPTION OF EXEMPLARY EMBODIMENTS

A method for controlling semiconductor manufacturing equipment and a system for controlling the equipment according to exemplary embodiments of the invention are hereinafter described with reference to the accompanying drawings.

First Embodiment

Figure 1:
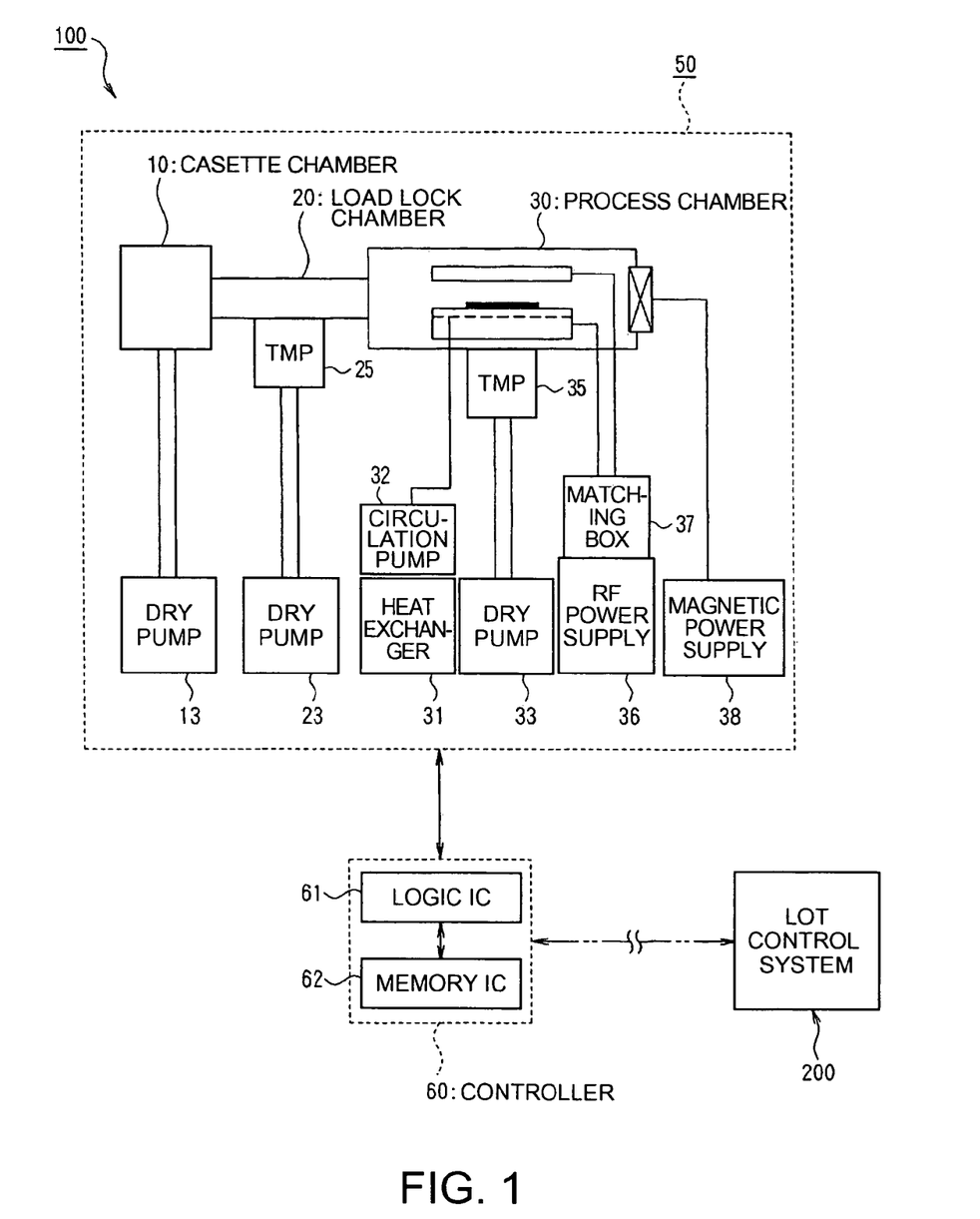
FIG. 1 shows an example structure of a control system of a dry etching device 100.

FIG. 1 shows an example structure of a control system of a dry etching device 100 according to one embodiment of the invention. This embodiment uses the dry etching device 100 as an example of the semiconductor manufacturing equipment.

Referring to FIG. 1, the dry etching device 100 is a parallel-plate reactive ion etching (RIE) apparatus. The dry etching device 100 includes a cassette chamber 10, a load lock chamber 20, a process chamber 30, turbomolecular pumps (TMP) 25 and 35, dry pumps 13, 23 and 33, a heat exchanger 31, a circulation pump 32, a radio-frequency (RF) power source 36, a matching box 37 and a magnetic power source 38. These components make up a device body 50. The device 100 also includes a controller 60 that controls operation of the device body 50.

Referring to FIG. 1, the dry pump 13 evacuates air from the cassette chamber 10. The dry pump 23 and the TMP 25 evacuate air from the load lock chamber 20. The dry pump 33 and the TMP 35 evacuate air from the process chamber 30. Evacuation of these pumps maintains a predetermined degree of vacuum in the chambers.

The heat exchanger 31 and the circulation pump 32 cool a stage in the process chamber 30. The circulation pump 32 circulates cooling water between the heat exchanger 31 and the stage. The RF power source 36 and the matching box 37 produce plasma in the process chamber 30 with high-frequency discharge. The magnetic power source 38 enhances plasma density on a wafer.

The controller 60 is coupled to the dry pumps 13, 23, 33 and the TMP 25 and 33, the heat exchanger 31 and the circulation pump 32, the RF power supply 36 and the matching box 37, and the magnetic power source 38 via signal lines. The controller 60 is also coupled to a lot control system 200. The lot control system 200 calculates waiting time required for a wafer to be processed next to be provided to the dry etching device 100 on a production line in a plant, for example. The controller 60 retrieves waiting time information from the lot control system 200.

The controller 60 includes a logic integrated circuit (IC) 61 and a memory IC 62. The logic IC 61 handles various kinds of processing, such as numerical calculation, logic operation and comparative judgment. The memory IC 62 stores a program of sequence control.

Figure 2:
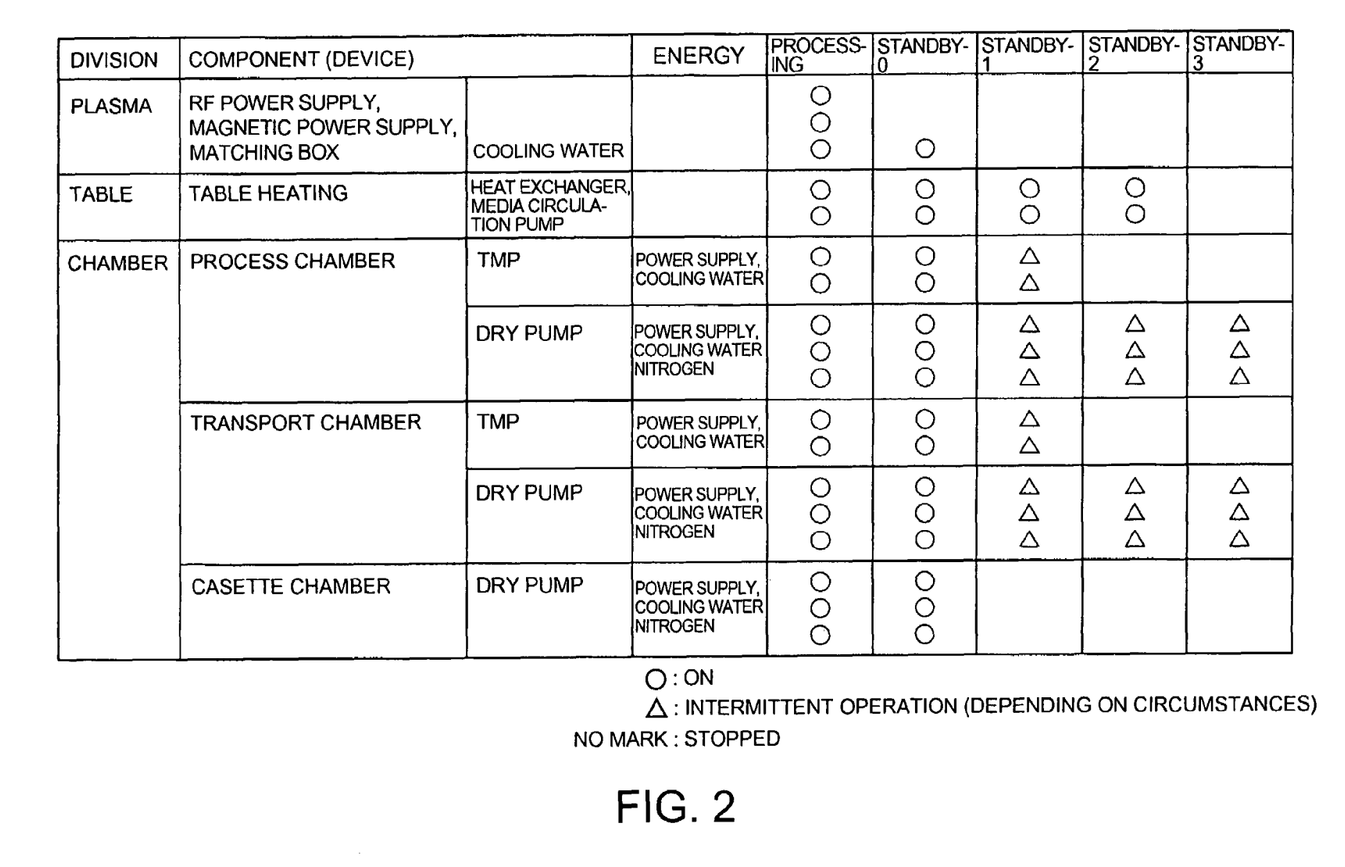
FIG. 2 illustrates electric power (supply) and other energy used by the dry etching device 100.

FIG. 2 illustrates electric power (supply) and other energy used by the dry etching device 100. Here, the other energy refers to energy other than electric power and include evacuated air, cooling water, compressed air, vacuum, nitrogen ($N_2$) and released heat. As shown in FIG. 2, the dry etching device 100 has various components (devices) that consume not only the electrical power but the other energy.

The circles in the table of FIG. 2 show that each of the devices is operating and consuming as much energy as it consumes during product processing (i.e. etching). The triangles in the table show that each of the devices is intermittently operating and consuming less energy than it consumes when it is "circled". No mark in the table indicates each of the devices is stopped.

Referring to FIG. 2, the standby mode of the dry etching device 100 are divided into the following four levels: standby-0, standby-1, standby-2 and standby-3. The standby-0 refers to a level at which product processing is ready. The standby-1 to standby-3 refer to a level at which product processing is not ready because part of the devices making up the dry etching device 100 is in a low-energy standby mode or stop mode.

Referring to FIG. 2, more devices are in the low-energy standby mode or stop mode during the standby-2 than the standby-1. Furthermore, more devices are in the low-energy standby mode or stop mode during the standby-3 than the standby-2. This way energy consumption in the standby mode is reduced step by step with the sequentially lowered energy levels.

FIGS. 3A, 3B, 4A and 4B are graphs showing patterns of energy saving control. In these graphs, the horizontal direction indicates a lapse of time and the vertical direction indicates process levels. Larger the process level, the smaller the energy consumed. Also in these graphs, a recovery time means the total of adding a falling time and a rising time.

Figure 3A:
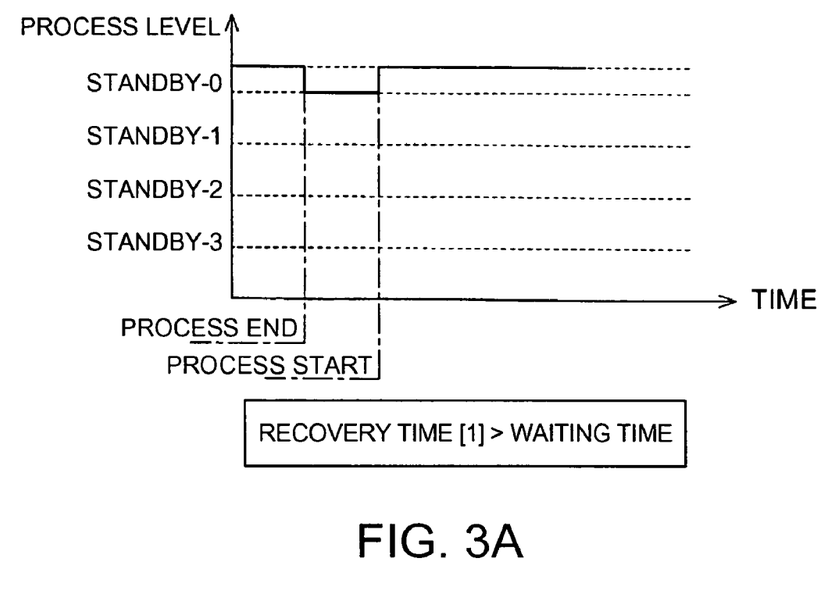
FIG. 3 is a graph showing a first pattern of energy saving control.

Referring to FIG. 3A, a recovery time [0] of the standby-0 is the total of adding a falling time [0] and a rising time [0]. The falling time [0] is required for the dry etching device 100 to fall from a mode of product processing (hereinafter referred to as "product processing mode") to the standby-0. The rising time [0] is required for the dry etching device 100 to rise from the standby-0 to the product processing mode. Note that the standby-0 refers to a level at which product processing is ready. At this level, both the falling time [0] and the rising time [0] are almost zero, and thus the recovery time [0] is zero.

Figure 3B:
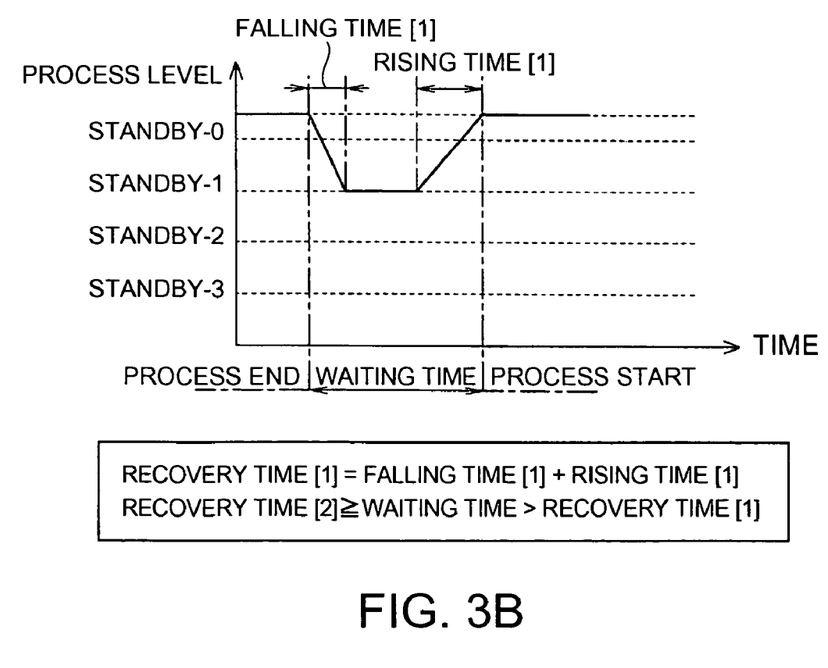

Referring to FIG. 3B, a recovery time [1] of the standby-1 is the total of adding a falling time [1] and a rising time [1]. The falling time [1] is required for the dry etching device 100 to fall from the product processing mode to the standby-1. The rising time [1] is required for the dry etching device 100 to rise from the standby-1 to the product processing mode. The falling time [1] is longer than the rising time [1] and the rising time [1] is longer than the rising time [0]. Therefore, the recovery time [1] is longer than the recovery time [0].

Figure 4A:
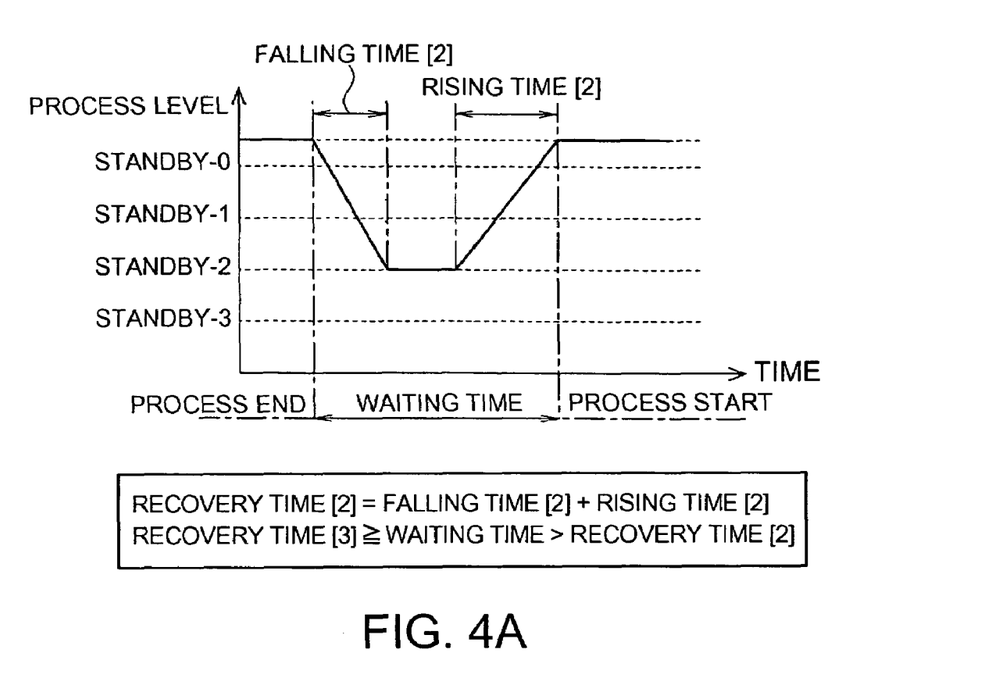
FIG. 4 is a graph showing a second pattern of energy saving control.

Referring to FIG. 4A, a recovery time [2] of the standby-2 is the total of adding a falling time [2] and a rising time [2]. The falling time [2] is required for the dry etching device 100 to fall from the product processing mode to the standby-2. The rising time [2] is required for the dry etching device 100 to rise from the standby-2 to the product processing mode. The recovery time [2] is longer than the recovery time [1].

Figure 4B:
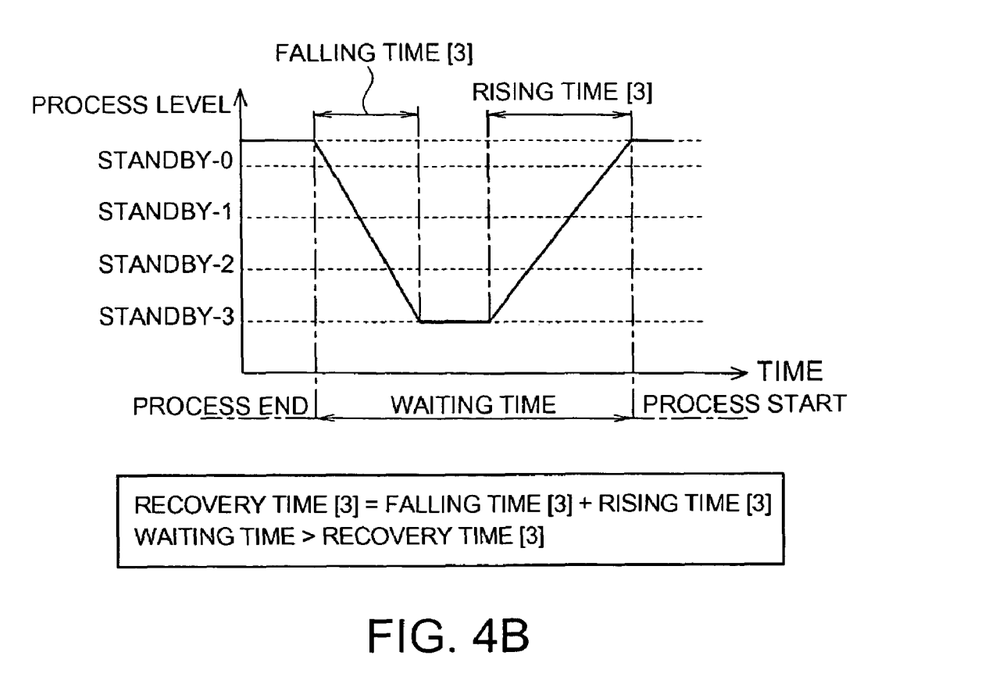

Referring to FIG. 4B, a recovery time [3] of the standby-3 is the total of adding a falling time [3] and a rising time [3]. The falling time [3] is required for the dry etching device 100 to fall from the product processing mode to the standby-3. The rising time [3] is required for the dry etching device 100 to rise from the standby-3 to the product processing mode. The recovery time [3] is longer than the recovery time [2].

On one hand, the amounts of energy consumed satisfy the following formula: Standby-0>Standby-1>Standby-2>Standby-3. On the other, the recovery time lengths satisfy the following formula: Standby-3>Standby-2>Standby-1>Standby-0. In other words, energy saving and the recovery time required for the product processing mode trade off against each other.

Figure 5:
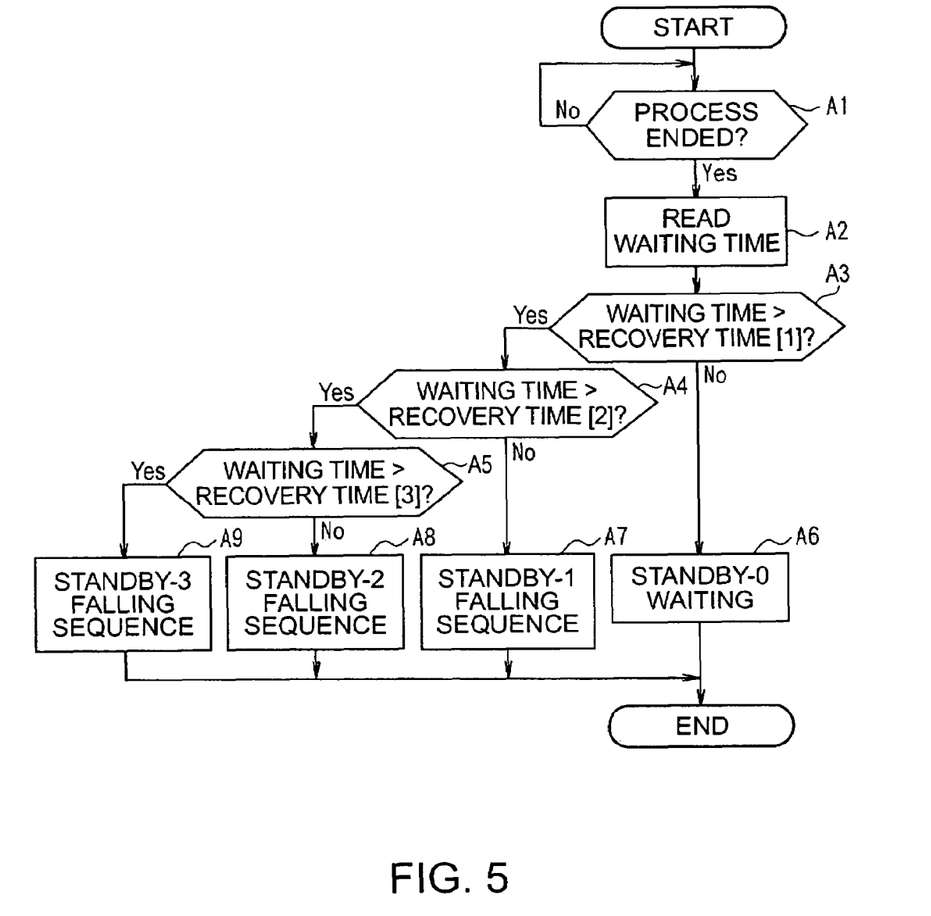
FIG. 5 is a flowchart showing a standby falling process.

FIG. 5 is a flowchart showing a standby falling process of the dry etching device 100. The process in which the dry etching device 100 falls to the standby levels will now be described.

Referring to FIG. 5, the controller 60 judges whether the dry etching device 100 completes product processing in Step A1. If the processing is completed, the process proceeds to Step A2. If not, Step A1 is going to be repeated after a predetermined period of time. The controller 60 retrieves waiting time information from the lot control system 200 in Step A2.

The controller 60 judges whether the waiting time is longer than the recovery time [1] of the standby-1 in Step A3. If the waiting time is longer than the recovery time [1] of the standby-1, the process proceeds to Step A4. If the waiting time is equal to or shorter than the recovery time [1], the process proceeds to Step A6.

The process proceeds to Step A6 if the waiting time is loner than the recovery time [0] but shorter than the recovery time [1]. In this case, the controller 60 carries out the falling control sequence of the standby-0 shown in FIG. 3A. Therefore, the dry etching device 100 stays in the standby-0, in which product processing is ready. In this state, other devices (components) included in the dry etching device 100 than the RF power supply 36 and the magnetic power supply 38 are in operation as shown in FIG. 2.

The controller 60 judges whether the waiting time is longer than the recovery time [2] of the standby-2 in Step A4. If the waiting time is longer than the recovery time [2] of the standby-2, the process proceeds to Step A5. If the waiting time is equal to or shorter than the recovery time [2], the process proceeds to Step A7.

The process proceeds to Step A7 if the waiting time is longer than the recovery time [1] but equal to or shorter than the recovery time [2]. In this case, the controller 60 carries out the falling control sequence of the standby-1 shown in FIG. 3B. Therefore, the dry etching device 100 stays in the standby-1. In this state, the RF power supply 36, the magnetic power supply 38, and the cooling water of the matching box 37 are stopped as shown in FIG. 2. In addition, the power and cooling water of the TMPs and the power, cooling water and nitrogen of the dry pumps are intermittently supplied. This means that the device is at a lower energy level than the standby-0.

The controller 60 judges whether the waiting time is longer than the recovery time [3] of the standby-3 in Step A5. If the waiting time is longer than the recovery time [3] of the standby-3, the process proceeds to Step A9. If the waiting time is equal to or shorter than the recovery time [3], the process proceeds to Step A8.

The process proceeds to Step A8 if the waiting time is longer than the recovery time [2] but equal to or shorter than the recovery time [3]. In this case, the controller 60 carries out the falling control sequence of the standby-2 shown in FIG. 4A. Therefore, the dry etching device 100 stays in the standby-2. In this state, the power supply and cooling water of the TMPs are stopped in addition to the state in the standby-1 as shown in FIG. 2. This means that the device is at a lower energy level than the standby-1.

The process proceeds to Step A9 if the waiting time is longer than the recovery time [3]. In this case, the controller 60 carries out the falling control sequence of the standby-3 shown in FIG. 4B. Therefore, the dry etching device 100 stays in the standby-3. In this state, the heat exchanger 31 and the circulation pump 32 are stopped in addition to the state in the standby-2 as shown in FIG. 2. This means that the device is at a lower energy level than the standby-2. The flow shown in FIG. 5 is completed after the falling control sequence is carried out in any of Steps A6, A7, A8 and A9.

Figure 6:
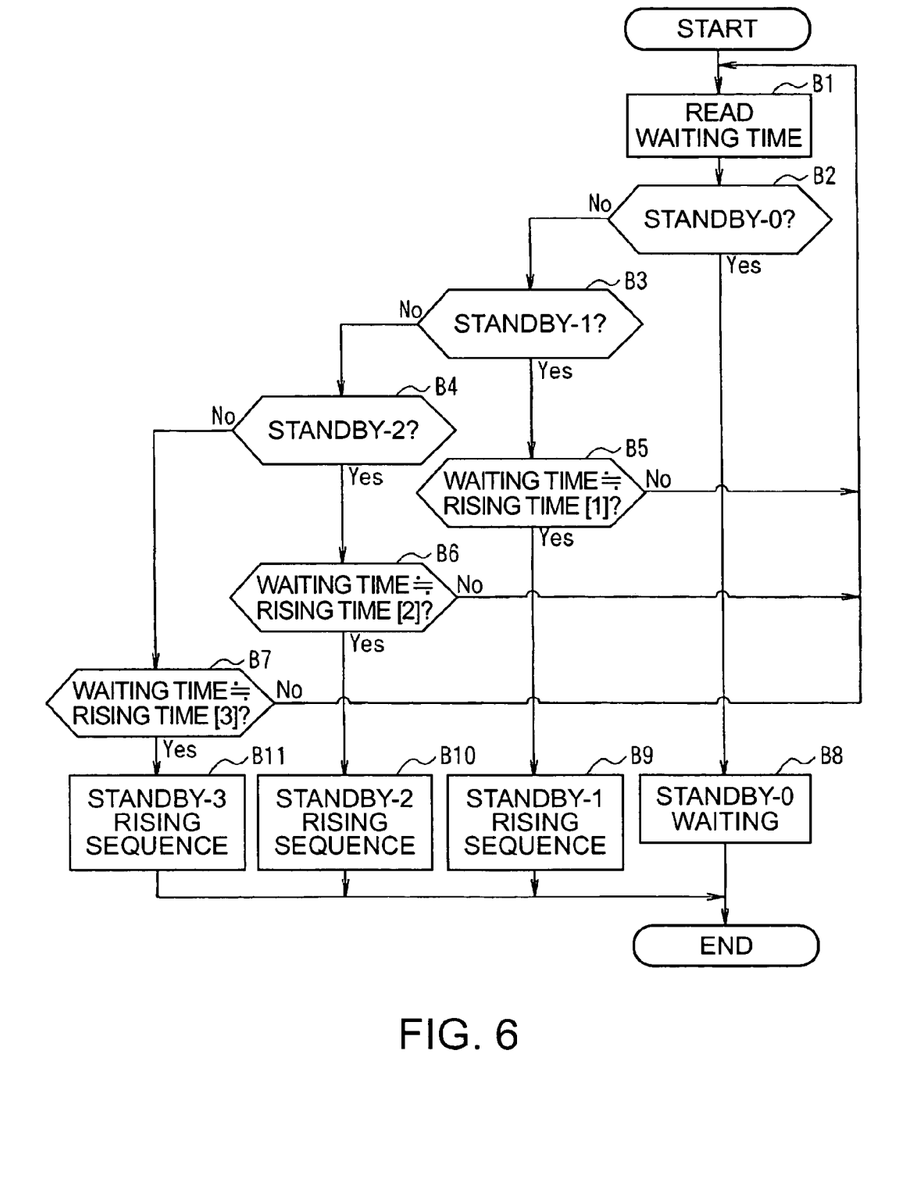
FIG. 6 is a flowchart showing a standby rising process.

FIG. 6 is a flowchart showing a standby rising process of the dry etching device 100. The process in which the dry etching device 100 rises to the product processing mode after it falls to either of the standby levels 1, 2 or 3 will now be described.

Referring to FIG. 6, the dry etching device 100 is in either of the standby-0, standby-1, standby-2 or standby-3 in Step B1. The dry etching device 100 reads a waiting time for the next product processing on a device control sequence in this step. Otherwise, the device calculates time before the next processing start by subtracting elapsed time from a retrieved waiting time. To read the waiting time in Step B1, the controller 60 retrieves waiting time information from the lot control system 200.

The controller 60 confirms the dry etching device 100 is in which standby level in Steps B2, B3 and B4.

Specifically, the controller 60 judges whether the dry etching device 100 is in the standby-0 in Step B2. If it is in the standby-0, the process proceeds to Step B8. During Step B8, the dry etching device 100 stays in the standby-0 under the control of the controller 60. If the controller 60 judges the dry etching device 100 is not in the standby-0 in Step B2, the process proceeds to Step B3.

The controller 60 judges whether the dry etching device 100 is in the standby-1 in Step B3. If it is in the standby-1, the process proceeds to Step B5. If the controller 60 judges the dry etching device 100 is not in the standby-1 in Step B3, the process proceeds to Step B4. In Step B4, the controller 60 judges whether the dry etching device 100 is in the standby-2. If it is in the standby-2, the process proceeds to Step B6. If the controller 60 judges the dry etching device 100 is not in the standby-2 in Step B4, the process proceeds to Step B7.

The controller 60 compares the rising time of the standby level it recognizes and the waiting time in Steps B5, B6 and B7.

Specifically, the controller 60 judges whether the waiting time is close to the rising time [1] in Step B5. If the waiting time is almost equal to or shorter than the rising time [I], the process proceeds to Step B9. If the waiting time is substantially longer than the rising time [1], the process gets back to Step B1.

Likewise, the controller 60 judges whether the waiting time is close to the rising time [2] in Step B6. If the waiting time is almost equal to or shorter than the rising time [2], the process proceeds to Step B10. If the waiting time is substantially longer than the rising time [2], the process gets back to Step B1. Likewise, the controller 60 judges whether the waiting time is close to the rising time [3] in Step B7. If the waiting time is almost equal to or shorter than the rising time [3], the process proceeds to Step B11. If the waiting time is substantially longer than the rising time [3], the process gets back to Step B1.

The controller 60 carries out a rising control sequence that enables the dry etching device 100 to do processing in accordance with the standby levels in Steps B9, B10 and B11.

Specifically, the controller 60 carries out the rising control sequence of the standby-1 in Step B9. The controller 60 carries out the rising control sequence of the standby-2 in Step B10. The controller 60 carries out the rising control sequence of the standby-3 in Step B11. As a result of the sequences, the electric power and the other energy are supplied to the dry etching device 100 at the level of the standby-0 or the product processing mode by the next product processing start. The flow shown in FIG. 6 is completed after the rising control sequence is carried out in any of Steps B9, B10 and B11.

The method for controlling the dry etching device 100 according to the present embodiment of the invention reduces energy consumed as the controller 60 makes the dry etching device 100 fall not to the standby-0 but to the standby-1 or lower automatically when the waiting time is at least longer than the recovery time [1]. Then the device stays in the standby-1 or lower state. As the remaining waiting time gets close to the rising time, the controller 60 carries out the rising control sequence automatically. The dry etching device 100 is thus in the standby-0 or the product processing mode by the next product processing start. It is therefore possible to reduce an energy loss without preventing TAT reduction.

The present embodiment uses the three energy levels: the standby-1, standby-2 and standby-3, the latter two of which are lower than the standby-1. The three levels have different electric power and other energy requirements and different recovery time lengths from each other. It is therefore possible to reduce an energy loss step by step and efficiently depending on the length of the waiting time.

Devices in related art stay in the standby-0, in which product processing is ready, no matter how long the waiting time is, thereby consuming fixed standby energy. In contrast, the present embodiment can reduce energy consumption in a standby mode depending on the length of the waiting time.

The average operation rate of various kinds of manufacturing equipment used in semiconductor manufacturing plants is said to be around 50%. This means that the equipment has 50% waiting time. In many cases, the equipment may stay in a standby mode for a long time in which it is left unused due to product mix.

By reducing an energy loss step by step and efficiently depending on the length of the waiting time as in the present embodiment, it is possible to save a great amount of energy used in the plants.

In the present embodiment, the dry etching device 100 corresponds to the semiconductor manufacturing equipment, and the wafer corresponds to the product. Also, the standby-1 and the product processing mode correspond to the "level at which product processing is ready". The standby-1, standby-2 and standby-3 correspond to the "low-energy level at which product processing is not ready" and the "plurality of patterns having different electric power and other energy requirements and different lengths of required time from each other". The controller 60 corresponds to the retrieving part, the comparison part and the controlling part.

While the dry etching device is used as an example of the semiconductor manufacturing equipment in the present embodiment, it is not intended to limit the invention. The invention is also applicable to diffusion furnaces, CVD devices, sputtering devices and wet-cleaning devices, for example.

Other Embodiments

The following changes (a) and (b) may be added to the process according to the above-described embodiment. (a) By adjusting the length of a predetermined period of time to maintain the low-energy level between the falling time and the rising time shown in FIGS. 3B, 4A and 4B, it is possible to have a fixed grace period before the next processing start after the dry etching device 100 recovers to the standby-0.

Even if the standby mode of the dry etching device 100 has some variance (in the degree of vacuum in a chamber, for example) just after the rising time, this adjustment makes it possible to converge the variance before the processing start. Accordingly, the quality of product processing can be stabilized.

(b) The standby levels are changed in line with changes in a predetermined production plan and restart time. This change is made by the controller 60, for example. When a new waiting time is longer than the recovery time, the standby level to save energy is changed and shifted to another level with different energy consumption. Instead, the recovery time may be extended by increasing the predetermined period of time to maintain the low-energy level between the falling time and the rising time.

When the new waiting time is shorter than the recovery time, the process is promptly shifted to a rising control sequence to calculate and output a rising end time. Instead, the rising end time is calculated and output, and then the standby level may be changed in line with a direction whether the process proceeds to the rising control sequence.

Even if a predetermined production plan and restart time are changed, it is possible to maintain the low-energy level and restore the device to the standby-0 before the next product processing start based on a new restart time. It is therefore possible to cope with production changes flexibly.

What is claimed is:

1. A method for controlling semiconductor manufacturing equipment in a waiting mode, comprising:
    retrieving information about a waiting time for a product to be provided to the semiconductor manufacturing equipment on a production line, the product being subjected to predetermined processing by the semiconductor manufacturing equipment;
    comparing the waiting time with a period of time required for energy saving control, the period of time required for the energy saving control including:
        lowering electric power and other energy used by the semiconductor manufacturing equipment in the waiting mode to a low-energy level at which the processing is not ready, and
        then raising the electric power and the other energy to a level at which the processing is ready; and
    providing the energy saving control during the waiting time if the waiting time is longer than the required period of time, the energy saving control providing a plurality of patterns in which the electric power and the other energy at the low-energy level and the required period of time are different from each other and, of the plurality of patterns, when only one pattern of the plurality of patterns has the required period of time shorter than the waiting time, the energy saving control is provided with the only one pattern, and when two or more patterns have the required period of time shorter than the waiting time, a pattern is selected from the two or more patterns having the lowest electric power and other energy at the low-energy level, the energy saving control being provided with the selected pattern.

2. The method for controlling semiconductor manufacturing equipment according to claim 1, the energy saving control further comprising:
    maintaining the electric power and the other energy used by the semiconductor manufacturing equipment in the waiting mode at the low-energy level for a predetermined period of time between lowering the electric power and the other energy to the low-energy level and raising the electric power and the other energy to the level at which the processing is ready.

3. The method for controlling semiconductor manufacturing equipment according to claim 2, the predetermined period of time being adjusted in a way that a fixed grace period is provided before the processing starts after the energy saving control is completed.

4. A system for controlling semiconductor manufacturing equipment in a waiting mode, comprising:
    a retrieving part to retrieve information about a waiting time for a product to be provided to the semiconductor manufacturing equipment on a production line, the product being to be subjected to predetermined processing by the semiconductor manufacturing equipment;
    a comparison part to compare the waiting time with a period of time required for energy saving control, the period of time required for energy saving control including:
        lowering electric power and other energy used by the semiconductor manufacturing equipment in the waiting mode to a low-energy level at which the processing is not ready, and
        then raising the electric power and the other energy to a level at which the processing is ready; and
    a controlling part to provide the energy saving control during the waiting time if the waiting time is longer than the required period of time, the energy saving control providing a plurality of patterns in which the electric power and the other energy at the low-energy level and the required period of time are different from each other and, of the plurality of patterns, when only one pattern of the plurality of patterns has the required period of time shorter than the waiting time, the energy saving control is provided with the only one pattern, and when two or more patterns have the required period of time shorter than the waiting time, a pattern is selected from the two or more patterns having the lowest electric power and other energy at the low-energy level, the energy saving control being provided with the selected pattern.

5. A method for controlling an apparatus on a production line having a processing mode and a plurality of low energy standby modes including a first standby mode and at least one second standby mode, the method comprising:
    obtaining a waiting time required for a product to arrive at the apparatus on the production line, the product being processed by the apparatus;
    calculating a first recovery time required for the apparatus to change from the first standby mode to the processing mode and calculating at least one second recovery time for the apparatus to change from the at least one second standby mode to the processing mode;
    executing a first control sequence associated with the first standby mode when the waiting time is greater than the first recovery time, executing at least one second control sequence associated with the at least one second standby mode when the waiting time is greater than the at least one second recovery time, and executing the at least one second control sequence associated with the at least one second standby mode when the waiting time is greater than both the first recovery time and the second recovery time;
    the apparatus consuming less power in the first standby mode than in the processing mode and consuming less power in the at least one second standby mode than in the first standby mode.

6. The method for controlling semiconductor manufacturing equipment according to claim 1, the method further comprising:

executing a first falling control sequence corresponding to a first standby mode for the semiconductor manufacturing equipment when the waiting time is greater than a first recovery time required for energy saving control of a first pattern of the plurality of patterns and less than a second recovery time required for energy saving control of a second pattern of the plurality of patterns;

executing a second falling control sequence corresponding to a second standby mode for the semiconductor manufacturing equipment when the waiting time is greater than the second recovery time and less than a third recovery time required for energy saving control of a third pattern of the plurality of patterns; and executing a third falling control sequence corresponding to a third standby mode for the semiconductor manufacturing equipment when the waiting time is greater than the third recovery time;

the third standby mode having a lower energy level than the second standby mode, and the second standby mode having a lower energy level than the first standby mode.

7. The method for controlling semiconductor manufacturing equipment according to claim 6, the method further comprising:

executing a first rising control sequence to return the semiconductor manufacturing equipment to a processing mode, when the semiconductor manufacturing equipment is in the first standby mode and the waiting time is less than or equal to a first rising time required to return the semiconductor manufacturing equipment from the first standby mode to a processing mode;

executing a second rising control sequence to return the semiconductor manufacturing equipment to the processing mode, when the semiconductor manufacturing equipment is in the second standby mode and the waiting time is less than or equal to a second rising time required to return the semiconductor manufacturing equipment from the second standby mode to the processing mode;

executing a third rising control sequence to return the semiconductor manufacturing equipment to the processing mode, when the semiconductor manufacturing equipment is in the third standby mode and the waiting time is less than or equal to a third rising time required to return the semiconductor manufacturing equipment from the third standby mode to the processing mode.

* * * * *